(12) United States Patent
Golub

(10) Patent No.: US 11,275,490 B2
(45) Date of Patent: Mar. 15, 2022

(54) SYSTEM AND METHOD FOR ENABLING USER-DEFINED DATA TRANSFORMATIONS THROUGH DYNAMIC CLIENT-SIDE WORKFLOWS

(71) Applicant: DataSiv, Los Altos, CA (US)

(72) Inventor: David Golub, Los Altos, CA (US)

(73) Assignee: DataSiv, Los Altos, CA (US)

( * ) Notice: Subject to any disclaimer, the term of this patent is extended or adjusted under 35 U.S.C. 154(b) by 0 days.

(21) Appl. No.: 17/023,296

(22) Filed: Sep. 16, 2020

(65) Prior Publication Data

US 2021/0132757 A1 May 6, 2021

Related U.S. Application Data

(60) Provisional application No. 62/901,135, filed on Sep. 16, 2019, provisional application No. 62/901,138, filed on Sep. 16, 2019.

(51) Int. Cl.
*G06F 3/0484* (2013.01)
*G06F 9/30* (2018.01)
*G06F 16/903* (2019.01)

(52) U.S. Cl.
CPC ........ *G06F 3/0484* (2013.01); *G06F 9/30181* (2013.01); *G06F 16/90335* (2019.01)

(58) Field of Classification Search
CPC ........ G06F 3/061; G06F 16/23; G06F 16/245; G06F 16/248; G06F 16/252; G06F 3/0484; G06F 16/90335; G06F 9/30181
See application file for complete search history.

(56) References Cited

U.S. PATENT DOCUMENTS

| | | | |
|---|---|---|---|
| 2017/0161347 A1* | 6/2017 | Raza | H04L 67/325 |
| 2019/0196672 A1* | 6/2019 | Mikheev | G06F 16/26 |
| 2020/0226156 A1* | 7/2020 | Borra | G06F 16/9024 |
| 2020/0257507 A1* | 8/2020 | Jaiswal | G06F 3/0483 |

OTHER PUBLICATIONS

Jie Song et al., FacetsBase: A Key-Value Store Optimized for Querying on Scholarly Data, Jun. 12, 2018, IEEE, vol. 9, No. 1, pp. 302-314 (Year: 2018).*

John Paul et al., A Cypher Query based NoSQL Data Mining on Protein Datasets using Neo4J Graph Database, Jan. 1, 2017, IEEE, pp. 1-6 (Year: 2017).*

* cited by examiner

*Primary Examiner* — Tam T Tran
(74) *Attorney, Agent, or Firm* — Goodwin Procter LLP

(57) ABSTRACT

A system and method for enabling data transformations as defined by a user through a dynamic workflow that accurately reflects how nodes and edges of the workflow are affected by changes made by a user. In some embodiments, users may interact with a main processing thread to provide changes to the workflow. A background processing thread may recursively propagate updates to the dependencies of the workflow based on the user's changes. The recursive operations performed by the background processing thread calculates and transmits results of the updated operations to the main worker thread for displaying to the user. The main processing thread displays results of recursive operations the data transformations without experiencing interruptions o the user interface.

20 Claims, 6 Drawing Sheets

SYSTEM AND METHOD FOR ENABLING USER-DEFINED DATA TRANSFORMATIONS THROUGH DYNAMIC CLIENT-SIDE WORKFLOWS

RELATED APPLICATIONS

This application claims priority to and the benefit of U.S. Provisional Patent Application No. 62/901,135 filed on Sep. 16, 2019 and titled "System and Method for In-Memory User-Defined Data Transformations on a Client", the disclosure of which is hereby incorporated by reference herein in its entirety. This application further claims priority to and the benefit of U.S. Provisional Patent Application No. 62/901,138 filed on Sep. 16, 2019 and titled "System and Method for Data Processing with Dynamic Acyclical Graphs on a Client", the disclosure of which is hereby incorporated by reference herein in its entirety.

FIELD

The present disclosure relates in general to the field of generating client-side data transformation workflows through a graphical user interface.

BACKGROUND

Individuals often use their personal devices to offload large data processing tasks onto remote high-powered processors of large server centers. However, due to data-privacy concerns, transmission speed concerns, or general convenience, it is often necessary to perform data processing on the client-side such as in web browsers. Unfortunately, browsers operate in a procedural fashion working on tasks serially, as opposed to multitasking in parallel. As a result, processing large sets of data may prevent other browser operations from executing, such as freezing the user interface. Even with the simplest operations, serial behavior over large datasets forces users to wait until all the data has been processed in order to continue browsing. These interruptions lead to a poor experience for the user and can de-incentivize such client-side processing in the browser.

Current approaches to alleviate these interruptions have attempted to intermittently pause the client process while doing a row-wise computation (e.g., extract key from a dictionary, filter array, reduce on an array) on an array or dictionary, or perform server side rendering. Client-side computation may be necessary when server-side computations may be costly for a large number of clients. The second approach of pausing the client may result in processing lag on the server side, causing the server side operation to take longer (e.g., it will pause the client for 100 ms for every 1 s of server side rendering). This lag leads to a poor user experience.

Current data processing workflows fail to provide a graphical user interface for generating data transformations executable by a client-side browser. Current techniques fail to provide encoding schemes that allow users to alter steps within an acyclic workflow while dynamically executing data transformations in parallel through data-processing pipelines.

SUMMARY

Many tools, including some tools used to generate workflows and transform data, would benefit greatly from providing a client-side rendering and computation. Thus, there exists a current need for an interactive workflow that provides for client-side data transformations, while overcoming the above-described limitations of monitoring an organization's affiliates.

In general, one innovative aspect of the subject matter described in the present disclosure can be embodied in a system and method for multi-threaded operations in a browser. By tracking dependency mappings of nodes in a workflow, the multi-threaded operations may propagate changes throughout the rest of the workflow by updating the dependent nodes. In some embodiments, methods may support the multi-threaded operations by reading and storing key-value pairings of a global data store for efficient data transmission and retrieval.

The foregoing and other embodiments can each optionally include one or more of the following features, alone or in combination. In some embodiments, a background thread may be generated by a main thread so that the main thread may continue user interface operations. Background threads may carry out demanding data transformations and other operations, among others. When returning data back to the main thread, background threads may store output in the global data store for reference by the main thread. In some embodiments, background threads may determine shards of a determined output before storing or returning to the main thread. By providing for such features, the present disclosure provides improvements to the efficiency of communication between a user's input to a graphical user interface, operations for updating data stored in a workflow, and reflecting updates to the data back to the user.

In general, another innovative aspect of the subject matter described in the present disclosure can be embodied by a workflow graph, including menus and tools to effectuate operations by edges and nodes of the workflow. In some embodiments, nodes of a workflow may represent user interface components for providing or receiving data to/from a user. Other nodes may represent operations performed over such data, such as queries, transformations, and analytics, among others. The unique structure of this workflow includes dependency mapping that allows changes to nodes to propagate throughout the workflow, rather than distributing such changes during compilation. These dynamic updates to a workflow provide immediate results to a user based on user input. Furthermore, performing these operations locally in a client-side browser minimizes unnecessary interruptions by network congestion allowing for a user to understand changes to a workflow while offline.

In some embodiments, menus may reflect properties of edges and nodes of the workflow. Menus may be used to update components in a graphical user interface which, in turn, reflect updates to associated nodes in a workflow. Similarly, nodes and edges in a workflow may be adjusted on a workflow graph to reflect changes to properties of associated components in a graphical user interface. The present disclosure enables a bilateral mapping of properties by storing properties and their associated updates in a global data store accessible by both the workflow graph and graphical user interface components. Furthermore, the efficient balance of processor operations between the main thread and background threads as provided by the present system allows for simultaneous updates to numerous nodes in a workflow graph and components in a graphical user interface. This efficiency balance of processor resources also provides for improvements to workflow generation by reducing interruptions to a browser's user interface often encountered when processing large datasets.

Other embodiments of this aspect include corresponding methods, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions. In some embodiments, the one or more computer programs may include browsers that, although often recognized as single threaded, are enabled by the present disclosure to perform multi-threaded operations on a workflow for the user.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings.

Figure 1:
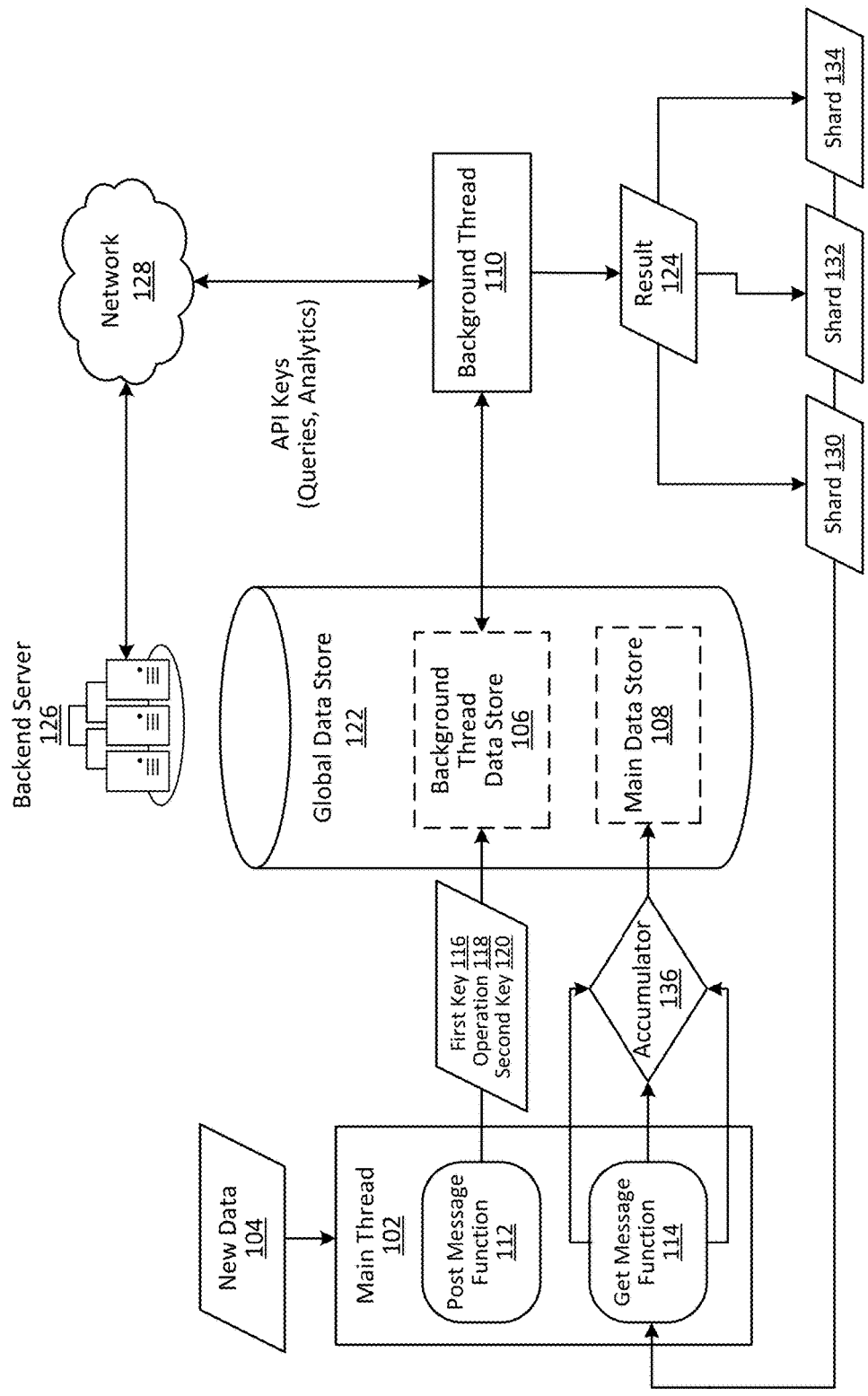
FIG. 1 illustrates an architecture for performing background worker thread operations, according to some embodiments.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the disclosure.

DETAILED DESCRIPTION

The following disclosure provides different embodiments, or examples, for implementing different features of the subject matter. Specific examples of components and arrangements are described below to simplify the present disclosure. These are, of course, merely examples and are not intended to be limiting.

Building dynamic user interfaces and associated workflows is often a very time consuming and repetitive process. User interfaces may have components that significantly change from project-to-project, and there are many bespoke applications (e.g., video editing software, time series analysis, anomaly detection interface, text classification interface, news browsing interfaces). However, many of these bespoke user interfaces and business workflows contain large amounts of duplicate components and transformations. Typically, workflows are built from scratch requiring large amounts of code. This not only leads to a large overhead in cost as software engineers build these projects separately, but also leads to usability problems and technical debt. Technical debt may be understood as a complexity of a code base that causes challenges in adopting new technologies or otherwise causes slow movements to change. Usability problems occur when code bases become large and difficult to understand. A single feature could take weeks, months, or even years to implement. This process leads to usability and maintainability issues.

Traditionally, directed acyclic workflow graphs do not incorporate the user interface into the graph. This decoupling of the user interface from the workflow (e.g., computer instructions) makes it challenging to build a dynamic user interface where, when part of the user interface changes, a user performs an action, or another part of the workflow executes. For example, clicking a button may trigger a particular workflow to run to query data and generate an output.

The present system provides a graphical user interface for generating workflows. Unlike previous systems for generating workflows, this system represents workflow operations and user interface jointly as a directed graph. When a node in a graph changes in the present system, all dependent components propagate dynamically. The graph of the present system that jointly captures user workflows allows for seamless workflow component changes from a user interface. The present system also allows for user-triggered updates in the directed acyclic graph.

The present system and method are directed to enabling a dynamic workflow interface for defining large data transformations in a client-side browser. The system not only provides for client-side operations on large data sets, but does so using multi-threaded operations. For example, one thread may provide for a workflow interface and another thread may provide for data processing without interrupting the interface. The present encoding scheme solves these interface interruptions, a problem often referred to as "lag," when executing large client-side computations to ensure interactivity between the browser's interface and the user, even when computing large data sets.

The present workflow interface as provided herein allows for the flexibility to create a large number of data-processing pipelines and applications that interoperate on a backend server. The workflow also recursively propagates updates throughout the dependent steps of the workflow. Although previous approaches, such as Robotic Process Automation systems and if-this-then-that systems (e.g., Zapier, IFTTT), provide graphical user interfaces for generating workflows, they cannot reflect updated results of changes made to a workflow in real-time. Previous techniques provide a linear chain of operations and, therefore, do not reflect how updates to a workflow affect various dependent nodes therein. This limitation not only limits the usability of such systems, but forces users to anticipate the effects of every change made to the workflow. Real-world systems contain many complex interdependencies which, are often not completely understood by the user. In many cases, users are unaware of most interdependencies provided by real-world workflows.

Furthermore, complex workflows cannot be easily defined in a visual diagram. Therefore, when handling complex programs, previous techniques become easily cluttered because they are often represented as several linear chains that merge and separate forming a complex graph of instructions.

Previous workflow techniques also provide for linear steps to creating a workflow and, therefore, fail to actively accommodate changes made to previous steps. Previous systems cannot encode such a dynamic workflow graph using their limited linear structure. Due to limitations of using a linear program structure, once the linear executable chains of previous systems are compiled, users cannot insert new data and have the system actively re-compile the chain for executing the tasks in real-time. Thus, iterating on the workflow can be a cumbersome task.

The present encoding scheme is able to process commands in a directed acyclic graph. According to some embodiments, a workflow engine compiles the user-defined operations displayed on the workflow interface into computer-executable instructions while dynamically reflecting such changes on the workflow graph. The present system also provides for real-time compilation of the user-defined workflow into computer-executable code, and does so without interrupting or otherwise lagging the user's interface.

According to some embodiments, the present system may be provided through a web browser executing locally on a client-side computer. Although web browsers are recognized as linear programs, the present system can chain together dynamic workflow operations without disrupting the user interface because the chain of operations are executed on the background thread without having to return the intermediate results back to the main thread. In other words, a user can define a function for operating on intermediate outputs of chained components while still facilitating data updates to the user interface. This chaining further reduces the lag from transporting data between the background and main thread after computation. According to some embodiments, the multi-threading of a browser's linear execution may be provided by web workers, which are supported on many browsers, such as Microsoft Edge, Windows Explorer, Chrome, Firefox, Safari, among others.

The present system allows for computation on the client side by offloading the data and computation to a background thread. According to some embodiments, operations may be performed asynchronously on a first come first serve memory. A background thread may be generated by a web worker operating in a client-side browser. Both threads, the main worker thread and the background thread may access a global data store for passing data. Results are then calculated on the background thread and are provided to the main thread in small batches, adding to the global storage. Results are returned as a dictionary of key value pairs in JSON format, either as an array or a dictionary, according to some embodiments. As operations are done incrementally and returned in small batches, the user experiences no lag in this process. In some embodiments, batch sizes may be 50,000 data points and may be intermittently spaced at 100 ms each to prevent lagging. According to tests performed across different browsers and modalities, smaller batch sizes may lead to smaller interruptions to a browser's interface. Therefore, in light of various capacities of client-side processors and browsers, batch sizes and spaces therebetween may vary greatly. Nevertheless, client-side computation may be performed over large data sources at a very low cost to interface operability.

According to some embodiments, a browser may receive a global data store for storing and fetching data in four keys: data, analytics, queries, and periodic tasks. In some embodiments, the global data store may store other data. Data keys reference a collection of components that may be rendered in a UI, such as a table or a button. Data keys may be defined by properties, such as a component type, a parent identifier, a style property, position state, runtime attributes, among others.

According to some embodiments, query keys reference data processing units that connect to a backend server. Query keys may include such information as a component type, parameters, and other data. Analytics keys may reference a dictionary mapping to provide values to machine learning components on a backend server, according to some embodiments. Periodic task keys may be used to schedule operations to run periodically. According to some embodiments, periodic task keys may be stored as a key value pair, the key indicating an identifier for a node of a workflow graphical user interface and the value indicating a start time, frequency, parameters, and notes.

FIG. 1 illustrates an architecture for performing background worker thread operations, according to some embodiments. While executing in a browser, architecture 100 provides for a main thread 102 that receives new data 104 from a user by the browser's computer interface. In some embodiments, new data 104 may include a key for a particular component of the user interface and an indication of a data operation issued therefrom. Upon receiving new data 104, main thread 102 may store new data 104 by writing to background thread data store 106 using a particular key-value pair. Main thread 102 may also store the key-value pair in main data store 108. In some embodiments, background thread data store 106 and main data store 108 may be locations in a global data store used by the browser. Global data store Background thread data store 106 may hold the data for processing by a persistent background thread 110 while the user continues interacting with main thread 102. According to some embodiments, background thread 110 may be implemented using a web worker interface. A person of ordinary skill in the art would understand a web worker as a script (e.g., JavaScript) that runs in the background, independently of other scripts, without affecting the performance of the page in a browser. Background thread data store 106 may be used to store intermediate outputs. According to some embodiments, main thread 102 may transmit data using communication functions that interact with background thread 110. For example, main thread 102 may use post message 112 to transmit data from main thread 102 to the background thread 110 and its associated background thread data store 106. Similarly, get message function 114 may retrieve data from background thread data store 106 and/or background thread 110. In addition to new data 104, post message 112 may further transmit a first key 116, an operation 118 to perform on the data, and a second key 120. First key 116 may be used to indicate a location in the global data store 122 to save results of the operation. Second key 120 may be used to indicate a location to retrieve data saved in the global data store 122. In some embodiments, second key 120 may contain the data itself rather than a key indicating a location in global data store 122.

According to some embodiments, operation 118 may point to or otherwise indicate code stored in global data store 122. This code may be previously provided or otherwise customized by users via graphical user interface navigation menus as described below. According to some embodiments, operation 118 may take as an input an arbitrary row in an array from first key 116, run computations, and return a result to second key 120. According to other embodiments, operation 118 could be run row wise, column wise, a client-side SQL query to the backend server 126, or otherwise user-provided code using the data According to some embodiments, upon completing operation 118, background thread 110 may store results in global data store 122 as a global key value pair dictionary. In some embodiments, main thread 102 may receive a notification from background thread 110 with results determined by background thread 110. After receiving the results, main thread 102 may store the results in main data store 108. In other embodiments, background thread 110 may store results in global data store 122, including background thread data store 106 and/or main data store 108, without instruction from main thread 102. Before storing, second key 120 may partition the results into disjoint shards in preparation for sending to main thread 102 individually to prevent lag on main thread 102. For example, when storing the results at 124, second key 120 may partition the results array into shards. According to some embodiments, the shards may be partitioned by a predetermined number of rows. The number of rows may be set arbitrarily by a user. For example, the first 10,000 rows partitioned into shard 130, the next 10,000 rows partitioned into shard 132, repeating until the nth shard 134. Then, after partitioning, shards 130, 132, and 134 may be individually stored in a dictionary of key value pairs of the global data store 122, where the key for each shard is concatenated with a shard identifier (e.g., shardID), and the value is the data contained in the shard.

According to some embodiments, the shards may be stored by an accumulator 136 into main data store 108, as shown in architecture 100. In some embodiments, accumulator 136 may receive shards 130, 132, and 134 at main thread 102 using get message function 114 to accumulate shards one-by-one sent from background thread 110 to be used by main thread 102. In some embodiments, accumulator 136 may store the accumulated shards in main data store 108. Accumulator 136 Results or shards thereof may be returned to the main thread 102 according to a predetermined time interval. According to some embodiments, a time interval may be used to reduce the processor requirements by main thread 102 to receive shards from background thread 110, therefore reducing the potential for interruptions in main thread 102. In some embodiments, the time interval may be based on the processing capacity allocated to the browser by the computer's operating system. In some embodiments, the time interval may be based more specifically on the processing capacity allotted by the browser to each of the main thread 102 and background thread 110. For example, results may be returned spaced 100 ms apart. Other predetermined time frames may be used. Upon receiving a result, main thread 102 may append the results into global data store 122, in some embodiments.

Figure 2:
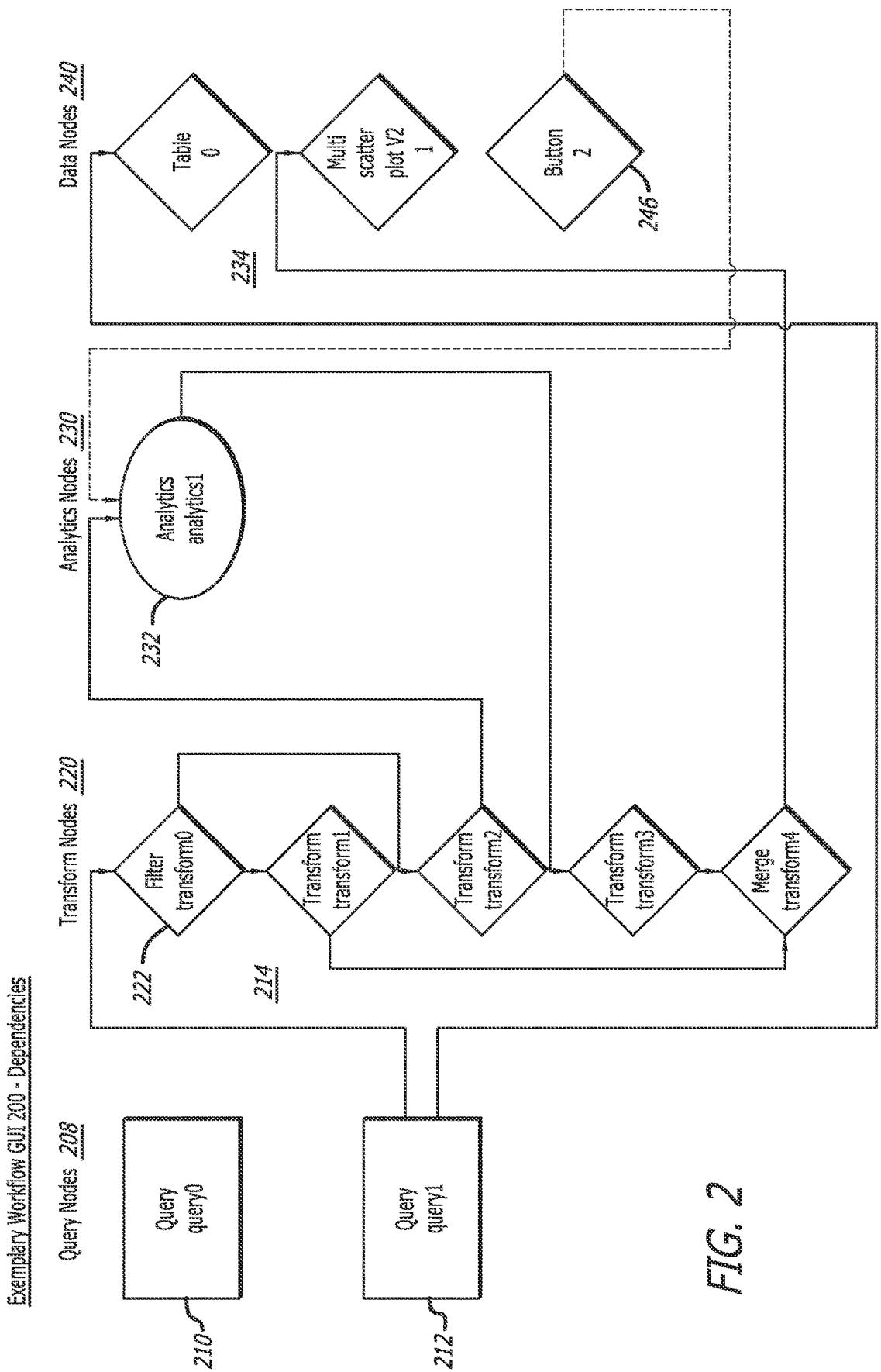
FIG. 2 illustrates an exemplary graphical user interface for generating a client-side workflow, according to some embodiments.

FIG. 2 illustrates an exemplary workflow graphical user interface for generating a client-side workflow, according to some embodiments. According to some embodiments, workflow graphical user interface (GUI) 200 includes four sets of connectable GUI nodes representative of four workflow components, such as query nodes 208, transform nodes 220, analytics nodes 230 and data nodes 240. Query nodes 208 may indicate query keys that point to operations that transmit data to and from a backend server 126 over a network 128. In some embodiments, query nodes 208 may communicate with servers and other data sources over network 128 using application programming interface (API) protocols, such as REST. In some embodiments, transform nodes 220 may include code written by a user that performs operations over data. Analytics nodes 230 may indicate analytics keys that reference machine learning and/or other statistical operations for displaying analyses to a user. Further, data nodes 240 may indicate data keys that reference components to be rendered on a graphical user interface. For example, data nodes 240 may include elements such as a table or a button.

According to some embodiments, solid arrows indicate dependencies. For example, query node 212 routes into transform node 222 by dependency arrow 214. Some embodiments indicate parts of the graph that are triggered on user action by dashed arrows. For example, a button may be represented by data node 246 which triggers analytics node 232. This trigger is represented by action arrow 234. In some embodiments, dependency arrows and action arrows may be differentiated using other characteristics, such as color of the arrows, shape of lines, or other means. Furthermore, dependencies (e.g., dependency arrow 214) and actions (e.g., action arrow 234) may be differentiated by elements other than arrows, such as node locations on workflow graph 200, among others.

The nodes displayed by workflow GUI 200 are configurable by a user. According to some embodiments, a user may drag arrows across workflow GUI 200 to assign dependencies and actions. A user may also configure the nodes of GUI 200 by mapping from the user interface of a workflow back into queries, transforms and analytics using code structured by a particular syntax (e.g., "{{ }}") through a properties menu.

Figure 3:
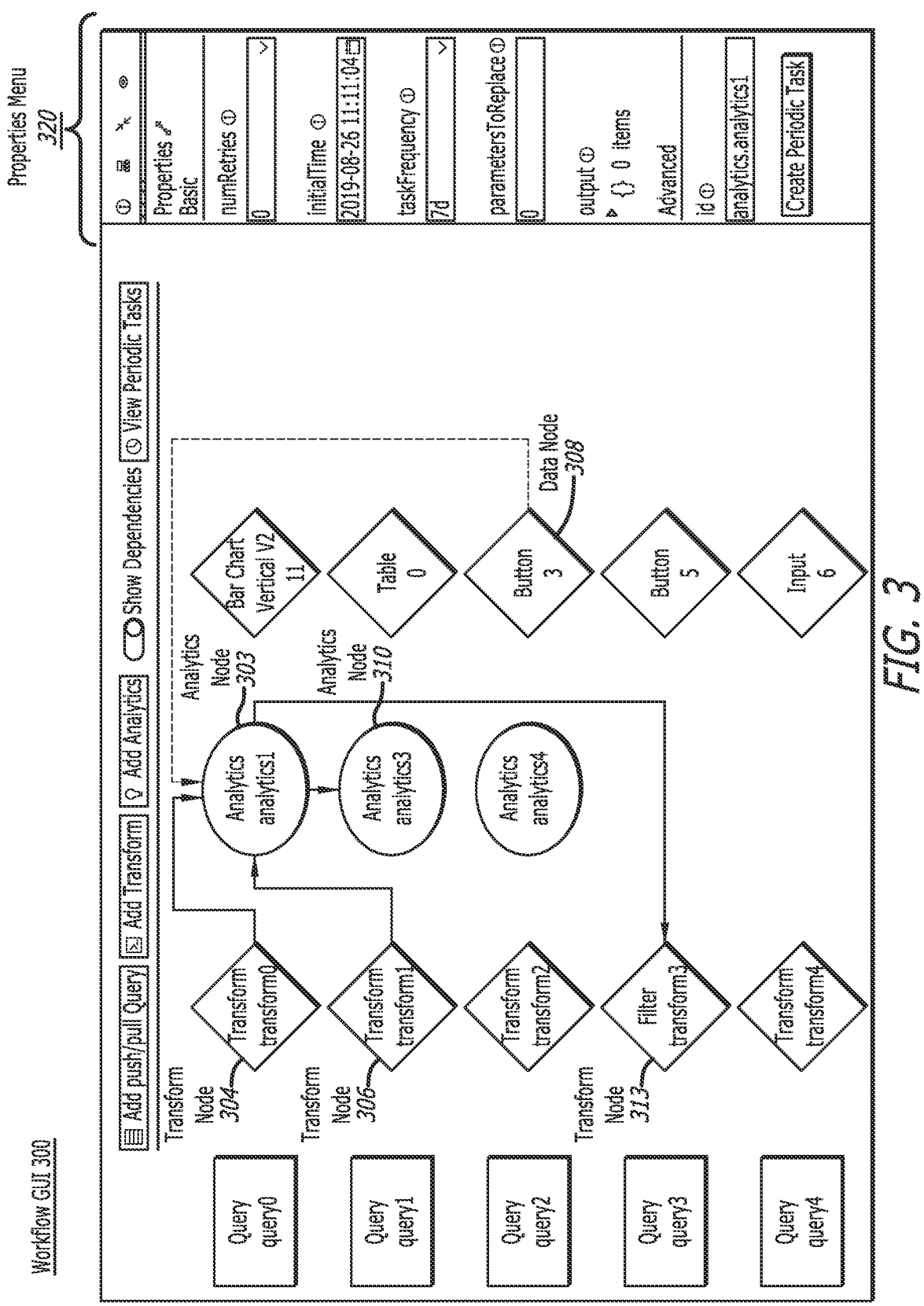
FIG. 3 illustrates dependencies and actions for a single component of a workflow using a graphical user interface, according to some embodiments.

FIG. 3 illustrates dependencies and actions for a single component of a workflow using a graphical user interface, according to some embodiments. Workflow GUI 300 depicts each dependency and action associated with analytics node 302, indicated by edges of the workflow. Thus, workflow GUI 300 indicates that analytics node 302 depends from transform node 304, transform node 306 and receives action data from data node 308. Workflow GUI 300 further indicates that analytics node 310 and transform node 312 depend from analytics node 302.

According to some embodiments, workflow GUI 300 further enables component customization by providing properties menu 320. For example, properties menu 320 displays properties associated with the operations of analytics node 302, such as number of times to retry the operations, an initial time to run the operations, a frequency in which the operations may be performed, parameters to replace, where to store output, among other properties. For example, properties menu 320 indicates that analytics node 302 is scheduled to run on a recurring basis according to the frequency value of 7 days. According to some embodiments, a user may use parameters to replace field of properties menu 320 to substitute any dependencies at runtime for analytics node 302.

Figure 4:
FIG. 4 illustrates a table properties menu of a graphical user interface builder, according to some embodiments.

FIG. 4 illustrates a table properties menu of a graphical user interface builder, according to one embodiment. Instead of providing a workflow graph as shown by workflow GUI 200 and workflow GUI 300, GUI builder 400 maps components according to each component's properties, such as those indicated by reference command ("{ }") and/or action command ("${ }$"). According to some embodiments, a reference command maps components to attributes defined in a global data store (e.g., global data store 122). According to some embodiments, different characters may be used to indicate a command according to a regex syntax. For example, the compiler of GUI builder 400 uses regex matching to replace characters with the properties provided in the associated workflow GUI (e.g., workflow GUI 200, workflow GUI 300). For example, if {{queries.query1.data}} is equal to [1,2,3,4], the compiler replaces {{queries.query1.data}} with the array [1,2,3,4]. While other characters may be used to denote dynamic replacement, the syntax for dynamic substitution may be based on a character's frequency of use. As such, replacement characters will not conflict with user-generated naming schemes, or other programmatic syntaxes.

No matter the syntax, replacement reference commands allow for referencing entries inside a global data store 122, where all queries, analytics and UI components are stored. For example, to reference the data result of query0 inside a table component, the data attribute of the table is set to {{queries.query0.data}}. When this component is rendered, the compiler replaces the data property of this component with the data of query0 which in turn would be substituted into the data property of the table (e.g., calling results.get ('data')).

Figure 5:
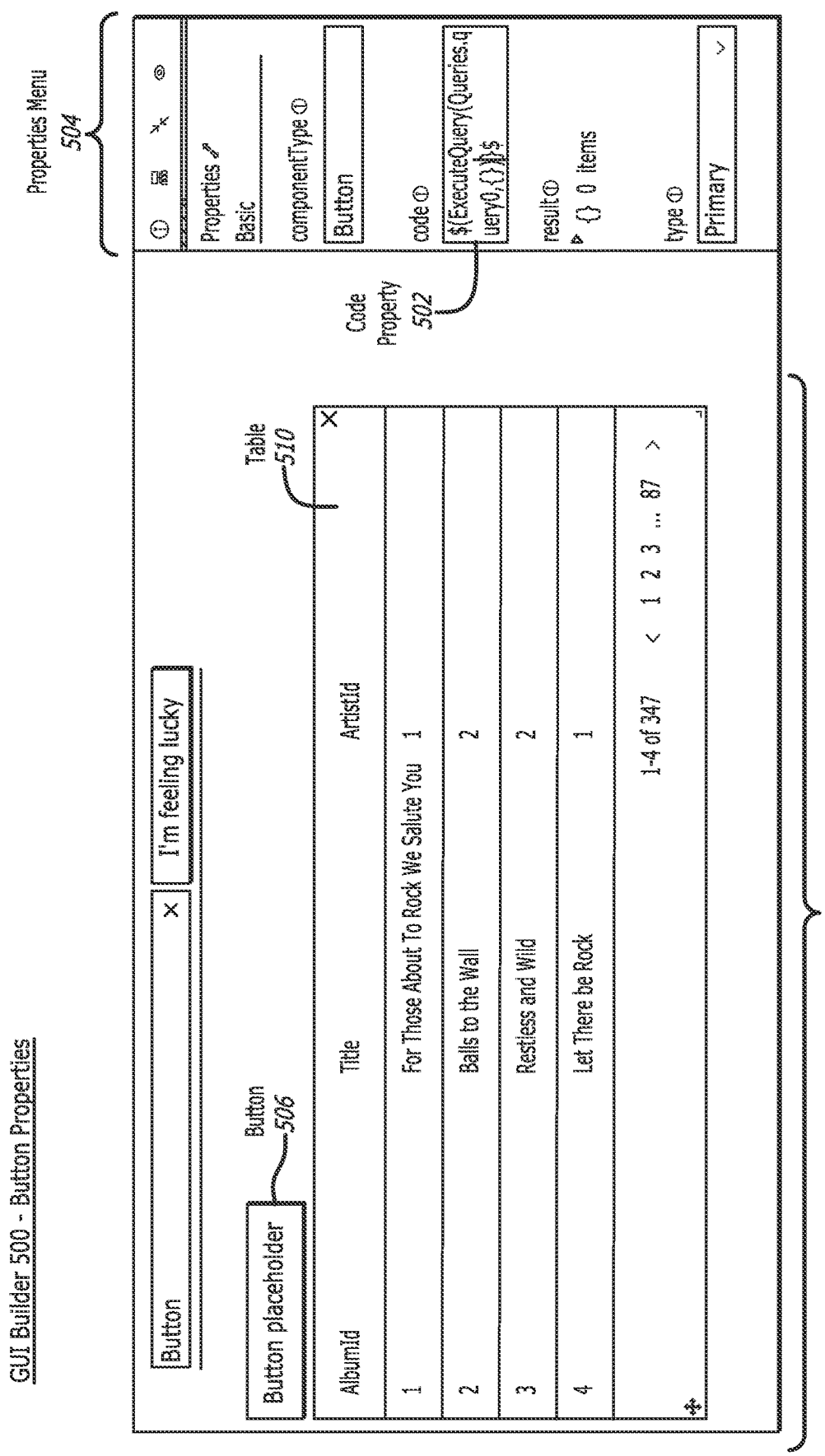
FIG. 5 illustrates a button properties menu of a graphical user interface builder, according to some embodiments.

FIG. 5 illustrates a button properties menu of a graphical user interface builder, according to some embodiments. GUI builder 500 depicts a code property field 502 in the code field of properties menu 504. According to some embodiments, a user may user code property field 502 to execute nodes in a workflow (e.g., workflow graph 200, workflow graph 300). According to some embodiments, query nodes (e.g., query nodes 208), transform nodes (e.g., transform nodes 220), analytics nodes (e.g., analytics nodes 230), and/or data nodes (e.g., data nodes 240) may be referenced by code property field 502 for executing the node's associated function.

For example, properties menu 504 depicts properties for selected button 506. The code field of properties menu 504 indicates that activating button 506 will execute query0 which, in turn, may cause all downstream nodes in the associated workflow graph to dynamically re-execute. If the downstream nodes include a data node (e.g., data nodes 240), then the user interface may generate an updated graphical user interface 508. For example, the result from executing query0 may be stored in the cache or other storage of the background thread (e.g., background thread data store 106) by setting the local cache of query0 (e.g., cache ['queries.query0.data']) equal to the returned results, which updates a last modified timestamp the global datastore to the current timestamp value. In some embodiments, the value of the last modified timestamp stored in the cache may be compared to the current timestamp value to validate that the cache reflects the most up-to-date data. Upon storing results in the cache, all components dependent on the query are re-executed.

For example, table 510 may display the data fetched from query0. As such, the workflow node associated with table 510 depends on query0. Thus, whenever the data attribute of query0 ({{queries.query0.data}}) is updated, the dependent components of query0, including table 510 of GUI 508, are automatically triggered and updated accordingly.

According to some embodiments, a user may define a code property field 502 for a GUI element (e.g., button 506) using action commands that trigger individual parts of a workflow (e.g., ${ExecuteNode(nodeID,parameters)}$, ${ExecuteQuery(nodeID, parameters)}, ${ExecuteAnalytics(nodeID,parameters)}$). For example, code property field 502 of button 506 includes user defined code to execute query0 According to some embodiments, entries in code property field 502 may indicate a node ID and parameter data according to the syntax. For example, code property field 502 indicates a nodeID pointing to query0 ("queries.query0") and provides an empty set of parameters ("0") as shown in GUI builder 500.

A compiler managed by the background thread (e.g., background thread 110) may extract the nodeID and parameters from the code property and generate a signature as an array of objects stored in the global document. When the browser runs the document, the signature may be checked and executed by a queue for rendering. Every time the global document updates, the browser may check the front of the queue to determine if it should run. If the browser determines that it should run, then the parameters of the current node in the graph may be extracted and a command may be transmitted to the backend server (e.g., backend server 126) with the extracted parameters. For example, code property 502 of properties menu 504 indicates an action command performable in response to a selection of button 506. Upon executing query0 as instructed by code property 502, the backend server (e.g., backend server 126) may then execute a command according to the type of query0.

For example, the component type of query0 may indicate Rest API. These user defined actions are defined using the Regex syntax (e.g., ${ . . . }$) as defined above and are inserted into the associated workflow graph by a compiler-store (e.g., global data store 122), according to some embodiments. When mapping components to objects defined in the global data store, property fields may generate autocomplete suggestions based on the property defined by the field, according to some embodiments. For example, GUI element 600 provides for data property field 602, which displays to the user autocomplete suggestions 604 indicative of data attributes of workflow nodes that depend from the workflow node of data property field 602. According to some embodiments, the data attributes may return arrays or dictionaries as entries. Attributes of the dependent nodes may provide details (e.g., text) as displayed by autocomplete suggestions 604. The dependent nodes' attributes may be fetched and displayed based on strings that a user enters into data property field 602. The fetching may be accomplished by a string matching algorithm. According to some embodiments, autocomplete suggestions 604 differ based on the node type (data node, transform node, analytics node, table node, button node).

Figures 6A, 6B:
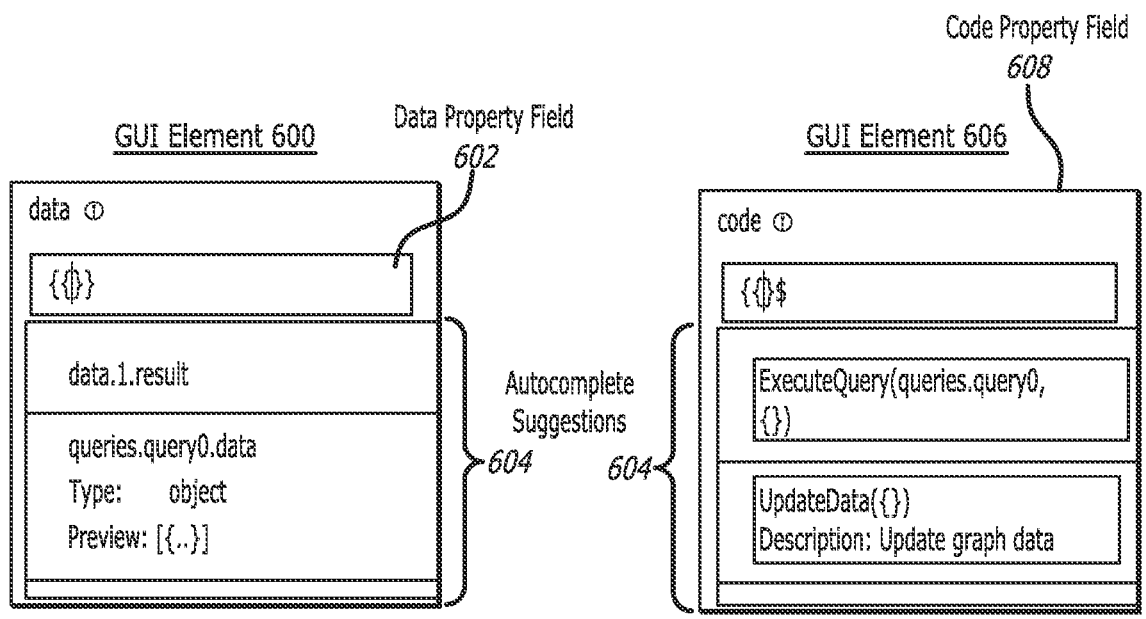
FIG. 6A illustrates mapping components to data objects defined in a global data store of a browser, according to some embodiments.
FIG. 6B illustrates mapping components to operations defined in a global data store of a browser, according to some embodiments.

FIG. 6B illustrates mapping components to operations defined in a global document object, according to some embodiments. For example, GUI element 606 provides for code property field 608 that displays to the user autocomplete suggestions 604 indicative of operations (e.g., queries or results from queries) defined by the global data store.

Different property fields may provide different autocomplete suggestions 604 based on the expected attributes of each respective property field and the command defined therein. For example, when a user types a reference command ("{ }") into a field, then the field extracts attributes from the node in the attribute graph (e.g., data.0.text, data.1.text, data.1.button, queries.parameters.result . . . ). These attributes are displayed as autocomplete suggestions 604.

As another example, button nodes use the action command ("${ }$") to reference queries or results of queries. In some embodiments, queries and their associated results may be identified by a key or ID, or otherwise provided as pointers to arrays or dictionaries stored in a location of the global data store assigned to store results (e.g., queries.query0.data.results for query results, analytics.analytics0.data for analytics data).

Figure 7:
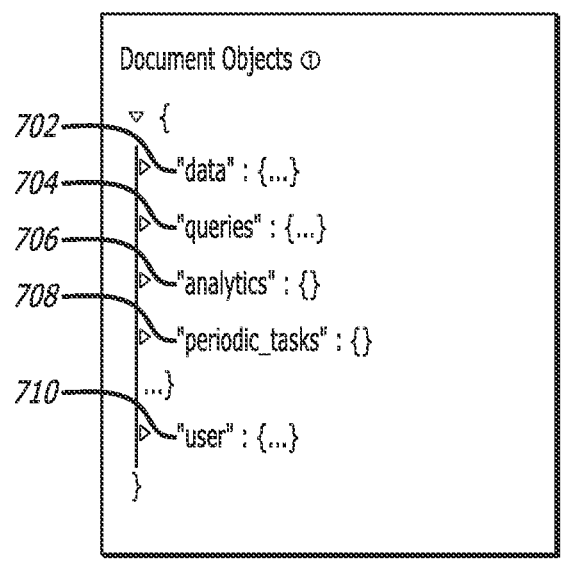
FIG. 7 illustrates the structure of a global data store, according to some embodiments.

FIG. 7 illustrates the structure of a global data store, according to some embodiments. In some embodiments, global document object 700 may be used as a global data store (e.g., global data store 122) to record and provide definitions for components, attributes, and properties. Global document object 700 may be accessible to all components (transforms, analytics, UI) for reading from and writing to this document object 700. According to some embodiments, global document object 700 includes five objects defined by attributes therein: data 702, queries 704, analytics 706, periodic tasks 708, and user 710.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

We claim:

1. A computer-implemented method, comprising:
providing, by a main processing thread on a processor and to a graphical user interface, a workflow graph comprising one or more nodes, wherein the main processing thread comprises a key-value pair store;
receiving, by the main processing thread, user input comprising new attributes applied to a node of the workflow graph;
transmitting, by the main processing thread to a background processing thread on the processor, a post message comprising:
a first key indicative of a retrieval location in the key-value pair store for retrieving input data,
a recursive operation associated with the node, and
a second key indicative of a storage location in the key-value pair store for storing a result of the recursive operation;
receiving, by the main processing thread from the background processing thread, a get message comprising the result of the recursive operation.

2. The computer-implemented method of claim 1, further comprising:
determining, by the background processing thread, the result based on the recursive operation performed over the input data;

storing, by the background processing thread and in the storage location in the key-value pair store, the result; and returning, by the background-processing thread and to the main processing thread, the get message comprising the result.

3. The computer-implemented method of claim 2, wherein storing the result further comprises storing, by the background processing thread, at least a fraction of the result to a data store of the background processing thread.

4. The computer-implemented method of claim 2, wherein the result comprises one or more shards, each shard being a fragment of the result.

5. The computer-implemented method of claim 4, wherein returning the get message comprises transmitting each shard separately.

6. The computer-implemented method of claim 2, wherein the recursive operation recursively calls a second operation for generating a second result.

7. The computer-implemented method of claim 1, wherein the operation comprises one of:
- a query function for communicating with data stores;
- a transform function for transforming the input data into the result;
- an analytics function for determining statistical data as the result; and
- a data function for translating between a generated user interface and the data store.

8. The computer-implemented method of claim 1, wherein the new attributes applied to a node comprises one of:
- changes to the attributes by a properties menu graphical user interface; and
- changes to the node in the workflow graph.

9. The computer-implemented method of claim 1, wherein the graphical user interface is provided by a browser.

10. The computer-implemented method of claim 1, wherein the key-value pair store comprises:
- a main partition for storing data associated with the main processing thread; and
- a background partition for storing data associated with the background processing thread.

11. A non-transitory computer-readable medium storing instructions that, when executed by a processor, are operable to cause the processor to perform operations comprising:
providing, by a main processing thread and to a graphical user interface, a workflow graph comprising one or more nodes, wherein the main processing thread comprises a key-value pair store;
receiving, by the main processing thread, user input comprising new attributes applied to a node of the workflow graph;
transmitting, by the main processing thread to a background processing thread, a post message comprising:
a first key indicative of a retrieval location in the key-value pair store for retrieving input data,
a recursive operation associated with the node, and
a second key indicative of a storage location in the key-value pair store for storing a result of the recursive operation;
receiving, by the main processing thread from the background processing thread, a get message comprising the result of the recursive operation.

12. The non-transitory computer-readable medium of claim 11,
determining, by the background processing thread, the result based on the recursive operation performed over the input data;
storing, by the background processing thread and in the storage location in the key-value pair store, the result; and
returning, by the background-processing thread and to the main processing thread, the get message comprising the result.

13. The non-transitory computer-readable medium of claim 12, wherein storing the result further comprises storing, by the background processing thread, at least a fraction of the result to a data store of the background processing thread.

14. The non-transitory computer-readable medium of claim 12, wherein the result comprises one or more shards, each shard being a fragment of the result.

15. The non-transitory computer-readable medium of claim 14, wherein returning the get message comprises transmitting each shard separately.

16. The non-transitory computer-readable medium of claim 12, wherein the recursive operation recursively calls a second operation for generating a second result.

17. The non-transitory computer-readable medium of claim 11, wherein the operation comprises one of:
- a query function for communicating with data stores;
- a transform function for transforming the input data into the result;
- an analytics function for determining statistical data as the result; and
- a data function for translating between a generated user interface and the data store.

18. The non-transitory computer-readable medium of claim 11, wherein the new attributes applied to a node comprises one of:
- changes to the attributes by a properties menu graphical user interface; and
- changes to the node in the workflow graph.

19. The non-transitory computer-readable medium of claim 11, wherein the graphical user interface is provided by a browser.

20. The non-transitory computer-readable medium of claim 11, wherein the key-value pair store comprises:
- a main partition for storing data associated with the main processing thread; and
- a background partition for storing data associated with the background processing thread.

* * * * *